(12) United States Patent
Arai et al.

(10) Patent No.: US 6,728,081 B2
(45) Date of Patent: Apr. 27, 2004

(54) MAGNETIC HEAD AND MAGNETIC DISK APPARATUS

(75) Inventors: Reiko Arai, Kokubunji (JP); Yoshiaki Kawato, Hachioji (JP); Katsuro Watanabe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/419,238

(22) Filed: Apr. 21, 2003

(65) Prior Publication Data

US 2003/0189797 A1 Oct. 9, 2003

Related U.S. Application Data

(63) Continuation of application No. 09/810,572, filed on Mar. 19, 2001.

(30) Foreign Application Priority Data

Mar. 27, 2000 (JP) ........................................ 2000-090715

(51) Int. Cl.[7] ............................. G11B 5/39; G11B 5/33
(52) U.S. Cl. ............................................................... 360/321
(58) Field of Search ................................. 360/321, 324, 360/324.12, 327.3, 327.31, 327.32, 327.1, 324.1, 313, 110

(56) References Cited

U.S. PATENT DOCUMENTS

| | | | |
|---|---|---|---|
| 5,493,467 A | 2/1996 | Cain et al. ................... | 360/321 |
| 6,181,532 B1 * | 1/2001 | Dovek et al. ................ | 360/321 |
| 2001/0004306 A1 | 6/2001 | Lee et al. .................... | 360/244 |
| 2001/0055184 A1 | 12/2001 | Shimazawa et al. ...... | 360/324.2 |
| 2002/0118493 A1 | 8/2002 | Kondo et al. ............... | 360/321 |

FOREIGN PATENT DOCUMENTS

| | | |
|---|---|---|
| JP | 04-103014 | 4/1992 |
| JP | 05-334629 | 12/1993 |
| JP | 06236526 | 8/1994 |
| JP | 07-296338 | 11/1995 |
| JP | 10-334418 | 12/1998 |
| JP | 2002-539570 | 11/2002 |

OTHER PUBLICATIONS

Miyazaki et al., "Giant magnetic tunneling effect in Fe/Al2O3/Fe junction,"*J. Magnetism and Magnetic Materials*, 139 (1995), L231–L234.

* cited by examiner

Primary Examiner—Julie Anne Watko
(74) Attorney, Agent, or Firm—Antonelli, Terry, Stout & Kraus, LLP

(57) ABSTRACT

The invention provides a magnetoresistive effect sensor that is a yoke type magnetoresistive effect sensor having a tunnel magnetoresistive effect film, which is operated stably with suppressed Barkhausen noise, and provides a reproducing head and a magnetic disk apparatus that use the magnetoresistive effect sensor. The magnetoresistive effect sensor is provided with a tunnel magnetoresistive effect film, a pair of electrodes for supplying a current in the film thickness direction of the magnetoresistive effect film, and a magnetic flux guide for guiding a magnetic flux from the recording medium: surface to the magnetoresistive effect film, wherein the magnetic domain of a free layer of the tunnel type magnetoresistive effect film and the magnetic domain of the magnetic flux guide are both controllable together.

18 Claims, 13 Drawing Sheets

← MEDIUM SURFACE

MAGNETIC HEAD AND MAGNETIC DISK APPARATUS

CROSS-REFERENCE TO RELATED APPLICATIONS

This application is a §53b Continuation of Ser. No. 09/810,572 filed Mar. 19, 2001, pending.

BACKGROUND OF THE INVENTION

1. Field of the Invention

The present invention relates to a magnetic head and a magnetic disk apparatus. More particularly, this invention relates to a tunnel magnetoresistive effect type magnetic head and a magnetic disk apparatus that uses a magnetic head of this type. A magnetic disk apparatus is usefully used for an electronic computer or an information processing equipment.

2. Description of the Related Art

As high density magnetic recording has become popular, the high sensitivity reproducing magnetic head is expected to be realized. A magnetoresistive effect type magnetic head (MR head) that utilizes the anisotropic magnetoresistive (AMR) effect has been used for such application as the reproducing head. NiFe has been used as the material of the active region of an MR head. The magnetoresistive change rate of this material is approximately 2%, and the realizable recording density is several Gb/in$^2$. Furthermore, recently a spin valve type magnetic head (GMR head) that utilizes giant magnetoresistive effect (GMR) effect has been used for such application. A GRM head comprises two ferromagnetic layers and a non-magnetic layer that is interposed between two ferromagnetic layers. In this structure, magnetization of one ferromagnetic layer is fixed, and a high magnetoresistive change rate due to an angle that is made by two magnetization directions of the two ferromagnetic layers. The magnetoresistive change rate of the GMR ranges from approximately 4 to 5%, and the high recording density of several tens Gb/in$^2$ is realized. However, to improve the recording density more, a magnetic head having higher magnetoresistive change rate is required.

As the magnetoresistive effect sensor having high magnetoresistive change rate as described hereinabove, a magnetoresistive effect film (TMR) that uses a tunnel magnetoresistive effect film having two ferromagnetic layers and a tunnel barrier layer interposed between the two ferromagnetic layers has attracted attentions. The magnetoresistive effect film that uses the tunnel magnetoresistive effect film is expected to be promising for realizing high density recording. A TMR comprising two Fe films and an Al oxide film interposed between two Fe films was reported to have a high magnetoresistive change rate of approximately 18% at a room temperature. For example, "Journal of Magnetism and Magnetic Materials" (Vol. 139, pp 231, 1995) reports the effect of the TMR. Furthermore, Japanese Unexamined Patent Publication No. Hei 4-103014 discloses a spin valve type TMR in which the magnetization direction of one ferromagnetic layer is fixed by disposing an antiferromagnetic layer adjacent to the ferromagnetic layer.

It is the object of the present invention is to provide a magnetoresistive effect sensor having a tunnel magnetoresistive effect film that is operated stably with reduced Barkhausen noise. The background will be described herein under.

Though a current is supplied in the film in-plane direction of a magnetic film in the case of the conventional magnetoresistive effect element, a current is supplied in the film thickness direction in the case of the TMR. A magnetic head structure that is different from the conventional magnetic head structure is required to realize the above-mentioned structure in which a current is supplied in the thickness direction. On the other hand, a TMR has two ferromagnetic layers as in the case of a conventional spin valve structure, and it is necessary to control the ferromagnetic layers magnetically as a matter of course. Furthermore, the element resistance is determined by the size of the element because a current flows in the film thickness direction.

For example, in the case of the hard bias structure that is same as that of the conventional magnetoresistive effect element, a hard magnetic film is disposed on the periphery of the element to control the magnetic domain. Therefore, in the case that this structure is used for the TMR, a current leaks to the hard magnetic film, and it is difficult to supply a current to the active region of the RMR correctly. Furthermore, the tunnel barrier layer that has a very thin thickness is exposed on the active region of the TMR. Therefore, very difficult working technique is required to prevent short-circuit between two ferromagnetic layers in the working on the facing surface. Furthermore, in the case that the track width of as thin as approximately 0.5 μm, the resistance of a element is as high as several hundreds to several kΩ inevitably.

SUMMARY OF THE INVENTION

To solve the problems described hereinabove, the structure in which a tunnel barrier layer is not exposed is effective different from the conventional structure in which a tunnel barrier layer is exposed on the facing surface. However, in such case, it is required to magnetically control a magnetic flux guide that is served to guide the magnetic flux from the facing surface to the TMR in addition to the ferromagnetic layer of the active region of the TMR as a matter of course. The present invention solves also this problem.

The basic structure of a magnetic head in accordance the first embodiment of the present invention has a magnetoresistive effective sensor provided with a magnetoresistive effect film having a free layer including a ferromagnetic layer the magnetization of which is rotatable corresponding to the external magnetic field, a pair of electrodes for supplying a current in the film thickness direction of the magnetoresistive effect film, and a magnetic flux guide for guiding a magnetic flux from the recording medium surface to the magnetoresistive effect film, wherein the magnetoresistive effect sensor is capable of controlling both the magnetic domain of the free layer and the magnetic domain of the magnetic flux guide together.

The typical example of the present invention involves an embodiment in which a magnetic domain control layer served for applying a bias on the free layer and the magnetic flux guide is disposed in the same plane in order to control the magnetic domain of the free layer of the tunnel magnetoresistive effect film and the magnetic domain of the magnetic flux guide.

Another example of the present invention involves an magnetic head having a magnetoresistive effect sensor provided with a magnetoresistive effect film that is a tunnel type magnetoresistive effect film comprising a free layer including a ferromagnetic layer, a tunnel barrier layer, a fixed layer including a ferromagnetic layer, and an anti-ferromagnetic layer for fixing the magnetization of the fixed layer, a pair of electrodes for supplying a current in the film thickness direction of the magnetoresistive effect film, and a magnetic flux guide for guiding a magnetic flux from the recording medium surface to the magnetoresistive effect film, wherein the magnetoresistive effect film is formed at the position where the magnetoresistive effect film is not disposed on the medium surface and in contact with the magnetic flux guide that extends from the medium surface to the facing surface, a magnetic domain control layer for applying a bias magnetic filed on the magnetic flux guide is laminated, and the magnetic domain of the free layer is also controlled by controlling the magnetic domain of the magnetic flux guide.

DETAILED DESCRIPTION OF THE PREFERRED EMBODIMENT

Figure 1:
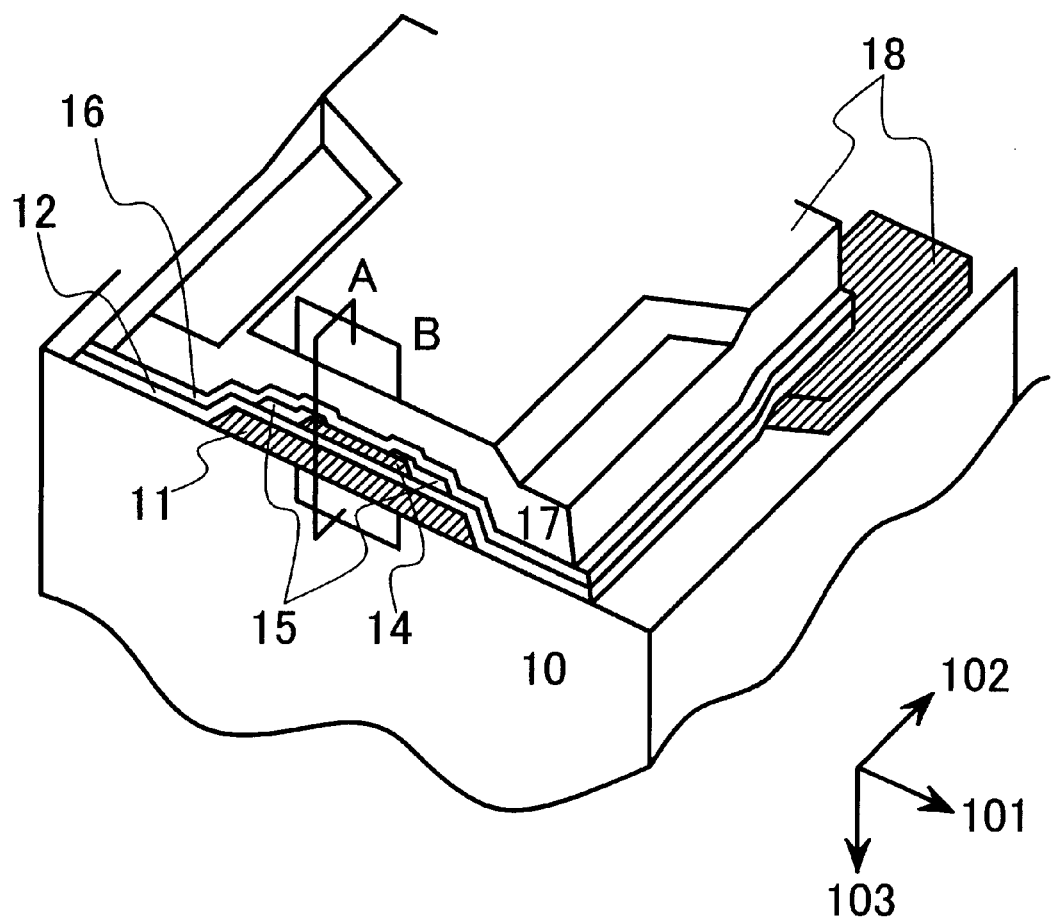
FIG. 1 is a perspective view of a magnetoresistive effect sensor in accordance with a first example of the present invention.

Prior to description of individual embodiments, the outline of the various embodiments of the present invention will be enumerated.

A first embodiment, which is the basic embodiment of the present invention, is described hereinabove.

The structure of the magnetoresistive effect sensor is classified into two methods according to the method for magnetically controlling the magnetic flux guide. Those are so-called hard bias structure and lamination structure. As a matter of course, the present invention can be applied to both methods.

The structure that is used in the present invention as the basic structure is the same as that which has been known heretofore, and the feature of the structure will be described briefly. In the case of the hard bias structure, a magnetic domain control layer is disposed on both sides of a magnetic flux guide, that is, so-called magnetic flux guide (yoke) and the magnetic domain control layer are disposed on the same plane. In this case, the magnetic domain control layer is formed of high resistivity material. Therefore, a current flows through a predetermined limited region, that is, a current flows only through predetermined tunnel type magnetoresistive effect film region. On the other hand, in the case of the lamination structure, a magnetic flux guide and a magnetic domain control layer are laminated. In this case, the magnetic domain control layer is laminated directly on the magnetic flux guide or the magnetic domain control layer is laminated on the magnetic flux guide with interposition of an intermediate layer. In the case of direct lamination, the magnetic flux guide is interlayer-coupled to the magnetic domain control layer ferromagnetically, and the direction of magnetization is parallel to each other. Furthermore, in the case the magnetic domain control layer is laminated on the magnetic flux guide with interposition of an intermediate layer, the case is classified into two sub-cases according to the method for disposing the intermediate layer. In the first sub-case, the magnetic domain control layer is interlayer-coupled to the magnetic flux guide ferromagnetically, and the direction of magnetization is parallel. This structure is similar to that of the above-mentioned lamination type. In other words, this structure is one modified structure of the lamination type. In the second sub-case, the magnetic domain control layer and the magnetic flux guide are magnetostatically coupled at the end. Therefore, in this case, the direction of in-plane magnetization of the magnetic flux guide is anti-parallel to that of the magnetic domain control layer. As described hereinabove, the relative relation between the respective magnetization directions of the magnetic flux guide and the magnetic domain control layer is different correspondingly to the first sub-case and the second sub-case of the lamination structure.

The important point of the present invention is to control the magnetic domain of a magnetic flux guide and to control the magnetic domain of a free layer of a magnetoresistive effect film regardless of the structure type that is employed. The concept of the present invention will be described herein under.

Figure 12A:
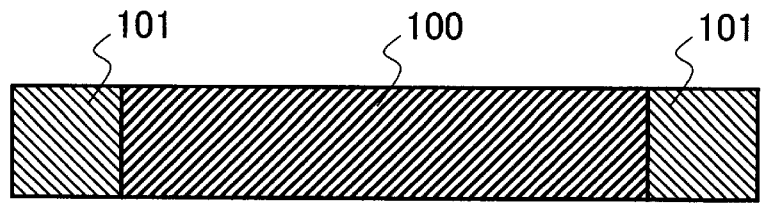
FIG. 12A to FIG. 12C are cross sectional views showing various examples of layout of the magnetic flux guide and the magnetic domain control layer.
Figure 12B:
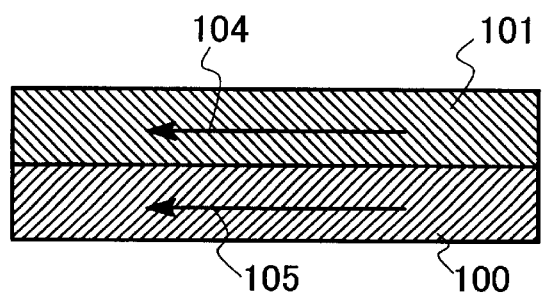
Figure 12C:
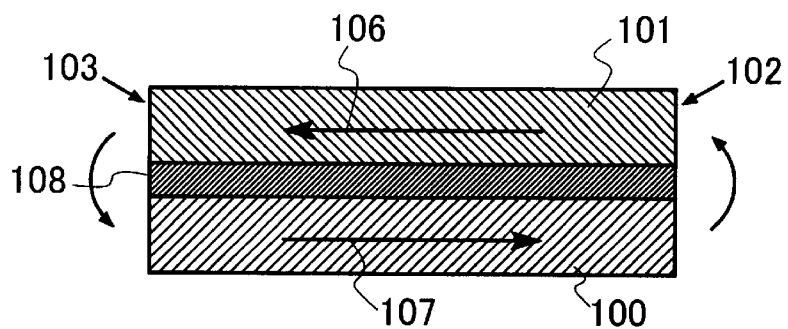

FIG. 12A to FIG. 12 are schematic diagrams illustrating the above-mentioned various embodiments, and these diagrams show the cross sections of various examples of layout of a magnetic flux guide and a magnetic domain control layer. The cross sections shown herein is the cross section in the width direction of the magnetoresistive element. FIG. 12A to FIG. 12C show three typical concepts respectively. FIG. 12A shows the case in which a magnetic domain control layer is disposed at both ends of a magnetic flux guide. The magnetic domain of the so-called magnetic flux guide 100 and that of the magnetic domain control layer 101 are disposed on the same plane. FIG. 12B shows the case in which a magnetic flux guide 100 and a magnetic domain control layer 101 are laminated one on the other. In this case, a very thin intermediate layer is interposed between the magnetic flux guide 100 and the magnetic domain control layer 101 as desired. In these examples, the magnetic flux guide and the magnetic domain control layer are coupled ferromagnetically as described hereinabove, and both magnetization directions 104 and 105 are directed in parallel. On the other hand, FIG. 12C shows the case in which a magnetic guide 100, an intermediate layer 108, and a longitudinal layer 101 are laminated. The magnetic flux guide and the magnetic domain control layer are coupled magnetostatically at the ends 102 and 103. In this case, the respective in-plane magnetizations 106 and 107 of the magnetic flux guide and the magnetic domain control layer are directed in anti-parallel to each other.

Figure 13A:
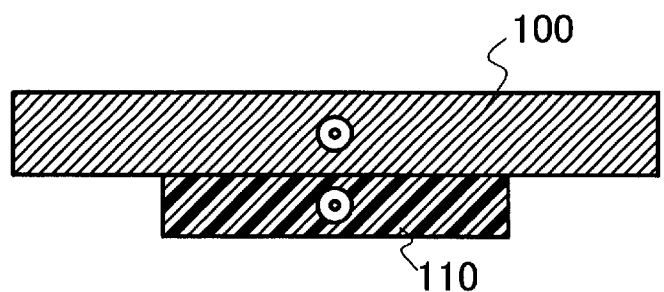
FIG. 13A and FIG. 13B are cross sectional views for describing the key point of the magnetic domain control of the TMR.
Figure 13B:
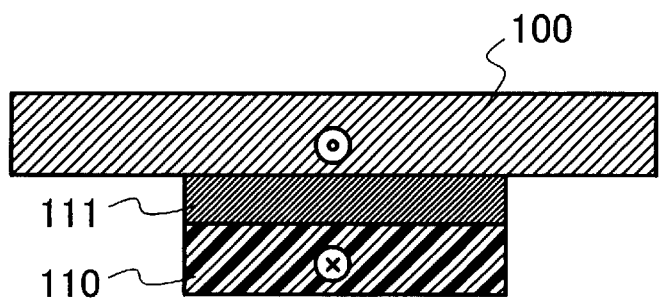

On the other hand, FIG. 13A and FIG. 13B are cross sectional views for describing the key point of magnetic domain control of the TMR. In this relation, the case is classified into two sub-cases, namely one sub-case in which a magnetic flux guide 100 and a TMR film 110 are laminated directly (FIG. 13A) and the other sub-case in which an intermediate layer 111 is interposed between a magnetic flux guide 100 and the a TMR film 110 (FIG. 13B). However, in any case of these, magnetic coupling is formed between the magnetic flux guide 100 and the TMR film 110. Therefore, the magnetic domain of the free layer in the TMR film is controlled by controlling the magnetic domain of the magnetic flux guide 100. As described hereinabove, in the present invention, the magnetic domain of a free layer in a TMR film is controlled by controlling the magnetic domain of a magnetic flux guide by use of the magnetic domain control film.

Typical various examples of the present invention will be further enumerated based on the above-mentioned general description. In another example of the present invention, a magnetic head is characterized by having a magnetoresistive effect sensor comprising a magnetoresistive effect film, a pair of electrodes for supplying a current in the film thickness direction of the magnetoresistive effect film, and a magnetic flux guide for guiding a magnetic flux from the recording medium surface to the magnetoresistive effect film, wherein the magnetoresistive effect film is a tunnel type magnetoresistive film provided with a free layer including the ferromagnetic layer, a tunnel barrier layer, a fixed layer including the ferromagnetic layer, and an antiferromagnetic layer for fixing magnetization of the fixed layer, and a magnetic domain control layer for applying a bias magnetic field on the free layer of the magnetoresistive effect film and a magnetic domain control layer for applying a bias magnetic field on the magnetic flux guide are formed in the same plane. In this example, the magnetic domain control layers are disposed on both ends of the magnetic flux guide.

Another example of the present invention is more practical. In detail, in the case of this magnetoresistive effect sensor, the magnetoresistive effect film is formed at the position so as not to be exposed on the medium surface, in contact with the magnetic flux guide extending from the medium surface to the facing surface, and a magnetic domain control layer is formed on both ends in the track width direction of the magnetoresistive effect film and the magnetic flux guide.

Still another example of the present invention is one in which the magnetic flux guide is separated to the medium surface side of the magnetoresistive effect film and to the facing surface side.

Another example of a magnetic head is one characterized by having a magnetoresistive effective sensor in which the magnetic flux guide is formed continuously from the medium surface side of the magnetoresistive effect film to the facing surface.

A further example of a magnetic head of the present invention is characterized by having a magnetoresistive effect sensor in which an intermediate layer is disposed between the magnetic flux guide and a free layer of the magnetoresistive effect film, and the magnetic flux guide and the free layer are magnetically coupled with each other with interposition of the intermediate layer.

Still another example of a magnetic head is characterized by having a magnetoresistive effect sensor comprising the magnetic flux guide formed of high resistive soft magnetic layer.

One other example of a magnetic head of the present invention is characterized by having a magnetoresistive effect sensor in which the magnetoresistive effect film and the magnetic flux guide are formed with interposition of an insulating layer.

Still another example of a magnetic head is characterized by having a magnetoresistive effect sensor in which the magnetic domain control layer is formed extendedly to the magnetoresistive effect film and the magnetic flux guide.

A further example of a magnetic head of the present invention is characterized by having a magnetoresistive effect sensor in which the magnetic domain control layer is formed extendedly to the magnetoresistive effect film and the magnetic flux guide with interposition of an insulating layer.

Still another example of a magnetic head is characterized by having an magnetoresistive effect sensor in which the magnetic domain control layer consists of oxide compound.

Another example of the lamination structure described hereinbefore is as follows. This example is characterized in that the magnetoresistive effect film is formed so as not to be exposed on the medium surface and so as to be in contact with the magnetic flux guide extending from the medium surface to the facing surface, and the magnetic domain control layer served to apply a bias magnetic field to the magnetic flux guide is laminated. In this case, by controlling the magnetic domain of the magnetic guide, the magnetic domain of the free layer is also controlled simultaneously. The detailed structure is described herein under. The magnetic head is characterized by having a magnetoresistive effect sensor that is capable of controlling not only the magnetic domain of the magnetic flux guide but also the magnetic domain of the free layer simultaneously provided with a magnetoresistive effect film, a pair of electrodes that are served to supply a current in the film thickness direction of the magnetoresistive effect film, and a magnetic flux guide served to guide the magnetic flux extending from the recording medium surface to the magnetoresistive effect film, wherein the magnetoresistive effect film is a tunnel type magnetoresistive effect film provided with a free layer including a ferromagnetic layer, a tunnel barrier layer, a fixed layer including a ferromagnetic layer, and an antiferromagnetic layer for fixing magnetization of the fixed layer, the magnetoresistive effect film is formed at the position so as not to be exposed on the medium surface, and a magnetic domain control layer served to apply a bias magnetic filed on the magnetic flux guide is laminated in contact with the magnetic flux guide extending from the medium surface to the facing surface. This magnetic head is characterized by having a magnetoresistive effect sensor that is capable of controlling the magnetic domain of the free layer by controlling the magnetic domain of the magnetic flux guide simultaneously.

Yet another example of a magnetic head of the present invention is characterized by having a magnetoresistive effect sensor in which the magnetic flux guide and the magnetoresistive effect film are magnetically coupled with interposition of an intermediate layer in the magnetoresistive effect sensor of the twelfth embodiment.

A further example of a magnetic head is characterized by having a magnetoresistive effect sensor in which the magnetic flux guide and the magnetic domain control layer are laminated with interposition of an intermediate layer in the magnetoresistive effect sensor of the twelfth and thirteenth embodiments.

In the above-mentioned structure, the magnetic flux guide and the magnetic domain control layer are magnetically coupled. Therefore, by controlling the magnetic domain of the magnetic flux guide, the magnetic domain control layer also controls the magnetic domain of the free layer of the magnetoresistive effect film.

Another example of a magnetic head of the present invention is characterized by having a magnetoresistive effect sensor in which the magnetic flux guide is separated to the medium surface side of the magnetoresistive effect film and the facing surface side in the magnetoresistive effect sensor described in any one of the twelfth to fourteenth embodiments. This is more practical.

Yet a further example of a magnetic head is characterized by having a magnetoresistive effect sensor in which the magnetic flux guide is formed continuously from the medium surface side of the magnetoresistive effect film to the facing surface in the magnetoresistive effect sensor described in any one of the previously-discussed examples.

Another example of a magnetic head of the present invention is characterized by having a magnetoresistive effect sensor in which the magnetic flux guide is formed of high resistance soft magnetic layer in the magnetoresistive effect sensor described in the previously-discussed embodiments.

A recording/reproducing head is formed by use of any one of various magnetoresistive effect sensors described hereinabove as a reproducing element. Furthermore, a magnetic disk apparatus is formed by use of such recording/reproducing head. A recording/reproducing head or a magnetic disk apparatus can be operated with reduced signal noise. Therefore, according to the recording/reproducing head or the magnetic disk apparatus, the very stable recording/reproducing characteristic can be obtained.

The usual basic structure of the conventional magnetoresistive type reproducing head may be employed sufficiently for this invention. In detail, in a typical embodiment, a lower magnetic shield consisting of magnetic material, a lower interlayer insulating film, a magnetoresistive type element for detecting a magnetic field by means of magnetoresistive effect, an upper interlayer insulating film, and an upper magnetic shield consisting of magnetic material are formed on a substrate.

Figure 10:
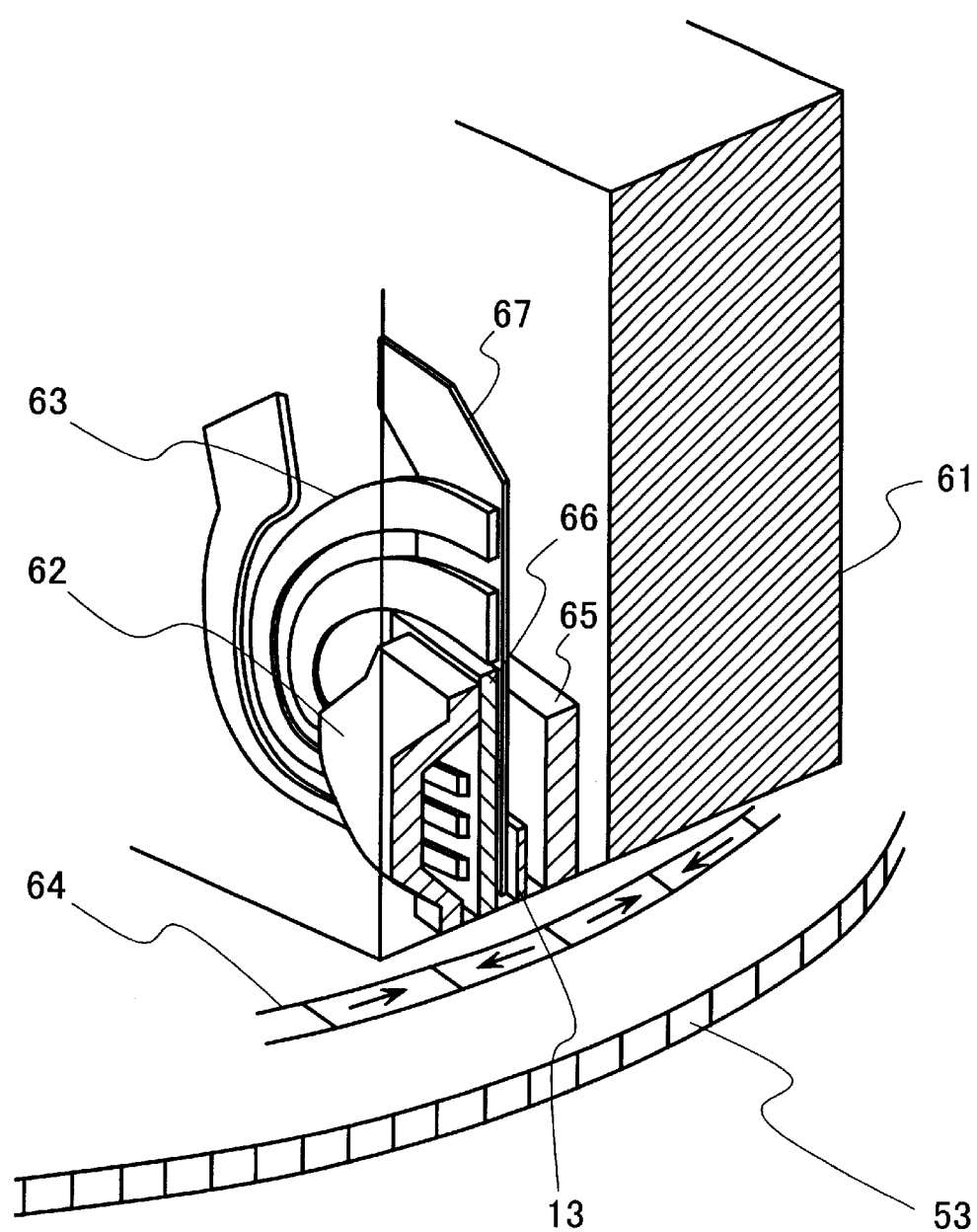
FIG. 10 is a perspective view illustrating the structure of a magnetic disk apparatus in accordance with the present invention.

FIG. 10 shows a partial perspective view of a magnetic recording/reproducing head in accordance with the present invention. As shown in FIG. 10, a magnetic recording/reproducing head is disposed to be opposed to the sliding surface of a magnetic disk 53. In FIG. 10, 64 denotes the magnetic recording on the magnetic disk as a model. A slider 61 forms a substrate, on which a magnetoresistive effect element is disposed. In other words, a magnetoresistive effect film (TMR film) 13 is mounted on the a lower magnetic shield 65. A lower magnetic core 66 is disposed with interposition of an insulating film 67. A reproducing head 13 that is interposed between the first shield 67 and the second shield film 65 is served for shielding the leak magnetic field from the periphery to thereby reproduce only the information located immediately under the reproducing head 13. The lower magnetic core 66 is served also as the upper magnetic shield and an electrode. Furthermore, an upper magnetic core (recording head) 62 is disposed with interposition of an exciting coil 62. The one side of the laminate comprising the first magnetic pole 66 and the second magnetic pole (recording magnetic pole) 62 is served as the sliding surface and the insulating film forms a recording gap.

Figure 7:
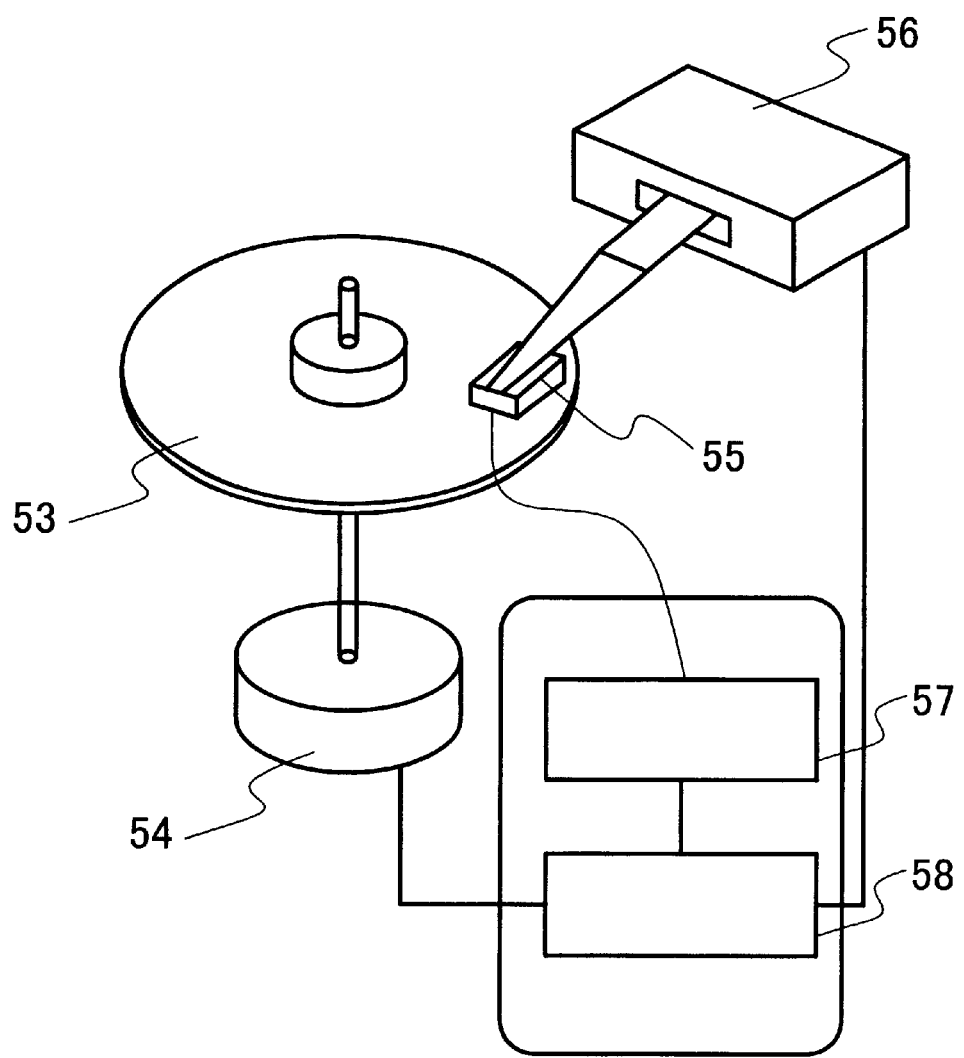
FIG. 7 is a diagram illustrating an exemplary structure of a magnetic disk apparatus in accordance with the present invention.

FIG. 7 shows a schematic explanatory diagram of an exemplary magnetic disk apparatus in accordance with the present invention. The magnetic disk 53 on which the information is recorded is rotated by means of a spindle motor 54. A slider 55 is disposed to be opposed to the sliding surface of the magnetic-disk 53. The slider 55 is provided with a built-in magnetic recording/reproducing unit. The magnetic recording/reproducing unit is controlled by means of a signal processing unit 57. The signal processing unit 57 contains electric control system such as a data reproducing and decoding system or structure control system. The structure control system and a slider are connected to an actuator 56. The conventional basic technique may be sufficiently applied to the magnetic disk apparatus for signal processing and electric system for controlling rotation. The detailed description of such technique is omitted herein.

First Embodiment

Figure 2A:
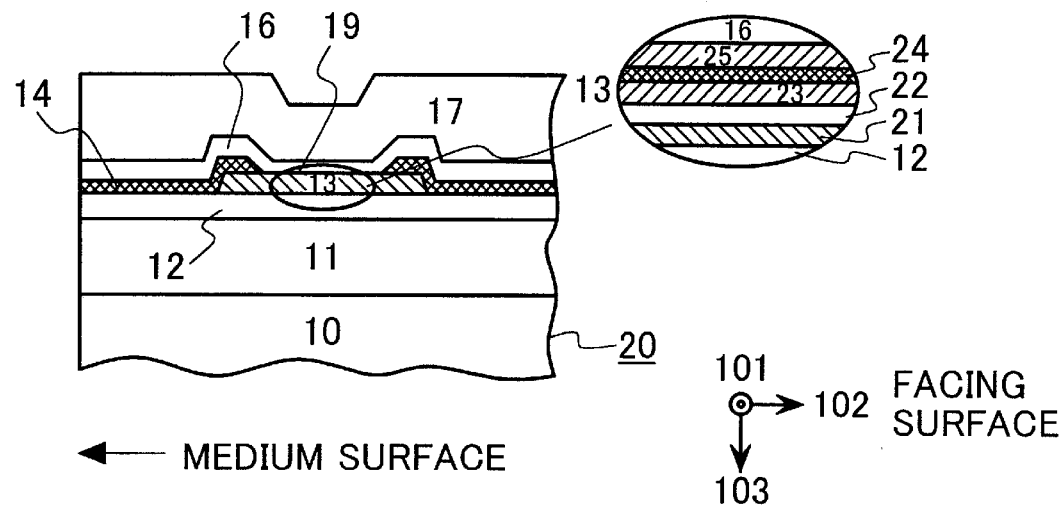
FIG. 2A is a cross sectional view of the magnetoresistive effect sensor in accordance with the first example of the present invention in the depth direction.
Figure 2B:
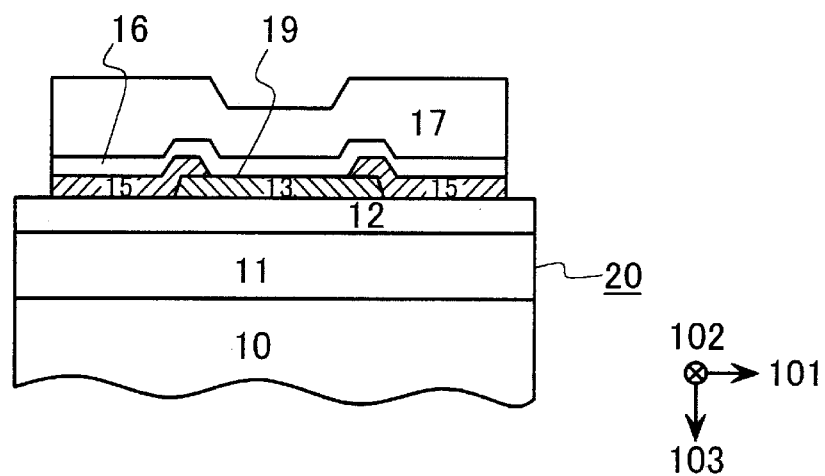
FIG. 2B is a cross sectional view of the magnetoresistive effect sensor in accordance with the first example of the present invention in the track width direction.

FIG. 1 is a partial perspective view of a magnetoresistive effect sensor 20 in accordance with the first example. As shown in FIG. 1, a lower magnetic shield film 11a lower gap film 12, a tunnel magnetoresistive effect film (referred to as TMR film (Tunneling Magnetoresistive Layer) hereinafter) 13, a magnetic flux guide 14, a magnetic domain control film 15, an upper gap film 16, a film 17 served both as upper magnetic shield film and lower magnetic core are formed successively on a substrate 10. As shown in FIG. 1, the upper magnetic shield film 17 and the lower magnetic shield film 11 are usually provided with respective electrode terminals 18 and are served as electrodes for supplying a current in the film thickness direction of the RMR film 13. The detailed cross sectional view of the magnetoresistive effect sensor is shown in FIG. 2A and FIG. 2B.

Figure 11:
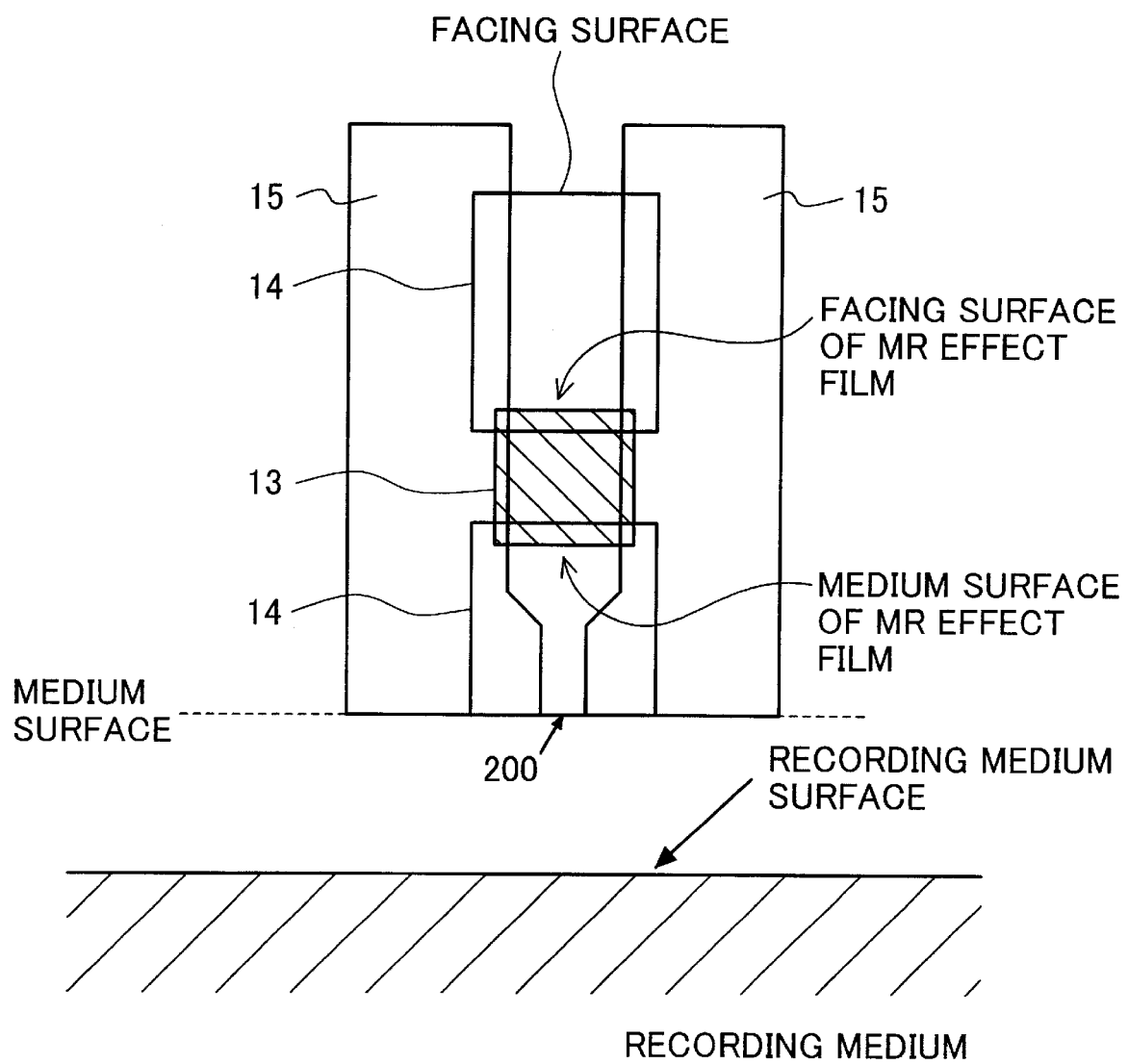
FIG. 11 is a plan view of a magnetoresistive effect sensor in accordance with the first example of the present invention.

The azimuth of the magnetoresistive effect sensor is defined by the track width direction 101, the head depth direction 102, and the magnetic head driving direction 103, and the cross section containing the line A and line B in FIG. 1 represent the cross section parallel to the head depth direction 102 and the track width direction 101. FIG. 2A shows a cross sectional view of a magnetoresistive effect sensor 20 parallel to the head depth direction 102, and FIG. 2B shows a cross sectional view of the magnetoresistive effect sensor 20 parallel to the track width direction 101. FIG. 11 is a plan view of the magnetoresistive effect sensor 20. The lower magnetic shield film 11 and the lower gap film 12 having desired form are disposed on the substrate 10. The TMR film 13 is disposed on a part of the lower gap film 12 at the position apart from the air bearing surface. The pair of magnetic flux guides 14 are disposed extending from the air bearing surface side to the head depth direction (102) with overlapping on the end of the TMR film 13.

The magnetic flux guide 14 is a soft magnetic film served for guiding a magnetic flux from the medium to the TMR film 13. The TMR film 13 comprises, for example, an under layer 21, an anti-ferromagnetic film 22, the first ferromagnetic film (referred to as fixed layer hereinafter) 23, a tunnel barrier layer 24, and the second ferromagnetic film (referred to as free layer hereinafter) 25. The respective in-plane magnetizations of the free layer 25 and the fixed layer 23 are directed to directions inclined 90 degrees respectively in the state where no external magnetic field is applied. The magnetization direction of the fixed layer 23 is directed fixedly in a preferred direction by means of the anti-ferromagnetic film 22. The first ferromagnetic film 23 is referred to as fixed layer in the meaning that the in-plane magnetization is fixed. On the other hand, the magnetization of the free layer 25 is rotated freely by means of the magnetic field that extends from the medium to the magnetic flux guide 14. The rotation of the magnetization causes the resistance change and generates the output of the element. The second ferromagnetic film 25 is referred to as free layer in the meaning that the in-plane magnetization rotates freely.

As shown in FIG. 11, the magnetic domain control film 15 is disposed on both sides along the sliding direction of the TMR 13, and the magnetic flux guide 14 is disposed on both sides in the direction that is intersectional with the sliding surface 200 of the TMR 13.

In the present embodiment, the magnetic flux guide 14 and the magnetic domain control film 15 should consist of high resistance material because a current that flows through the TMR film should not leak to the magnetic flux guide 14 and the magnetic domain control film 15.

As shown in FIG. 2B, magnetic domain control films 15 are disposed on both sides of the TMR 13 and the magnetic flux guide 14 in the track width direction 101 so as to extend partially overriding. The magnetic domain control film 15 is a ferromagnetic film that is served to apply a bias magnetic field in order to suppress the generation of the magnetic domain of the magnetic flux guide 14 and free layer 25.

On the TMR film 13 and on the magnetic flux guide 14 and the magnetic domain control film 15 that are partially overridden on the TMR film 13, the upper gap film 16 and the upper magnetic shield film 17 are formed. The upper gap film 16 is in contact with the TMR film 13 only on the portion of the through hole 19. Both sides of the through hole 19 is structured with the magnetic flux guide 14 and the magnetic domain control film 15. The lower magnetic shield film 11 and the upper magnetic shield film 17 have respective lead electrode terminals 18. A current is supplied and the reproduction output is detected through the connection to the electric terminals. When a current is supplied to the electrode terminal 18, the current flows only to the TMR film 13 through the through hole 19.

Next, various exemplary materials will be described in detail.

Usual material may be used for the lower magnetic shield film 11. Exemplary materials used suitably for the lower magnetic shield film 11 include Co base amorphous alloy such as CoNbZr or the like, NiFe alloy, FeAlSi alloy, or CoNiFe alloy. The film thickness of the lower magnetic shield film 11 ranges approximately from 1 to 5 $\mu$. Usual material may be used for the upper magnetic shield film 17 sufficiently. Exemplary materials used suitably for the upper magnetic shield film 17 include NiFe alloys and CoNiFe alloys, multi-layer film comprising ferromagnetic film and oxide, and ferromagnetic alloy films containing metalloid such as B and P. The upper magnetic shield film 17 is served also as the lower core of the recording magnetic head.

Because the lower gap film 12 is served as the under layer of the TMR film 13, the surface of the lower gap film 12 is desirably smooth and clean so that the characteristic of the TMR film 13 is stabilized and exhibits high resistance change. Exemplary materials used suitably for the lower gap film 12 include, for example, Ta, Nb, Ru, Mo, Pt, Ir, alloys that contain some of these elements, alloys containing W, Cu, or Al, and multi-layer structure consisting of other elements. Examples of the multi-layer structure consisting of other elements include, for example, Ta/Pt/Ta, and Ta/Cu/Ta. As a matter of course, laminates of the various element may be used.

As the lower gap film 12, the elements, for example, Ta, Nb, Ru, Mo, Pt, Ir, and alloys containing these elements, and alloys containing W, Cu, or Al, and laminate structure of multi-layer structure consisting of different elements and ferromagnetic materials. For example, Ta/NiFe is exemplified. The film thickness of the lower gap film 12 ranges from approximately 3 nm to 30 nm. Usually, the film thickness of the lower gap film 12 is designed correspondingly to the gap between the lower magnetic shield film II and the upper magnetic shield film 17. The upper gap film 16 is formed of the same material as used for the lower gap film 12, or formed of Au or Al. The under layer 21 is served to make the coupling magnetic field of the anti-ferromagnetic film 22 strong. Exemplary materials used suitably for the under layer 21 include Ta, NiFe, and laminate film of these materials such as Ta/NiFe.

Exemplary materials used suitably for the anti-ferromagnetic film 22 include MnIr, MnPt, FeMn, CrMn alloys, and MnPtPd and NiMn alloys.

The fixed layer 23 and the free layer 25 are formed of single layer structure consisting ferromagnetic material such as NiFe alloy, Co alloy, CoFe alloy, or CoNiFe alloy or multi-layer structure formed of the ferromagnetic films. The multi-layer structure of ferromagnetic films comprising of a plurality of layers such as two layers or three layers may be used. Exemplary multi-layer structure of ferromagnetic films include, for example, CoFe/NiFe, or CoFe/NiFe/CoFe. As the multi-layer structure of ferromagnetic films, the laminate structure comprising ferromagnetic film and non-magnetic film may be used. Exemplary laminate structure comprising ferromagnetic film and non-magnetic film include, for example, Co/Ru/Co, or CoFe/Ru/CoFe. Those various multi-layer structures of ferromagnetic film are effective for prevention of the diffusion on the interface and suppression of anisotropic dispersion. The film thickness of the under layer 21 ranges approximately from 3 nm to 10 nm, the film thickness of the anti-ferromagnetic film 22 ranges approximately from 2 nm to 25 nm, and thickness of the fixed layer 23 and the free layer 25 range approximately from 1 nm to 10 nm.

Exemplary tunnel barrier layer 24 includes an insulating layer consisting of various insulating materials such as oxide or nitride, and the laminate film comprising layers of these insulating materials may be used. Examples of the tunnel barrier layer 24 include single layer of, for example, Al—O, Si—O, or Ta—O, or laminate structure comprising laminate films of such material having a ferromagnetic film interposed between the laminate films may be used. An detailed example of such laminate structure includes, for example, Al—O/Co/Al—O. Oxide may be formed directly or may be formed by oxidation in an oxygen atmosphere using plasma. For example, a metal film, for example, Al film is formed, and it is subjected to oxidation. The film thickness of the tunnel barrier layer 24 is as thin as approximately 0.5 nm to 3.0 nm.

The magnetic flux guide 14 is served as the region that prevents a current from leaking from the upper gap film 16 to the lower gap film 12. Exemplary films used suitably as the magnetic flux guide 14 include soft magnetic film having high resistivity, for example, multi-layer structure comprising layers of ferromagnetic material and insulating material. Examples of the multi-layer structure comprising films of ferromagnetic material and insulating material include CoFe/$Al_2O_3$/CoFe, or CoFe/$SiO_2$/CoFe. The film thickness of the magnetic flux guide 14 ranges from approximately 5 nm to 15 nm. Exemplary materials used for the soft magnetic film having high resistivity include $MnZnFe_{2,3}$, $NiZnFeO_2O_3$, FeSiO, and CoAlO. Furthermore, the laminate film comprising films of these materials may be used.

The magnetic domain control film 15 is also served as the region that prevents a current from leaking from the upper gap 16 to the lower gap film 12 like the magnetic flux guide 14. Exemplary materials used suitably for the magnetic flux guide 14 include high resistivity materials such as $Fe_2O_3$, $Fe_3O_4$, NiO, and CoO. The film thickness of the magnetic flux guide 14 ranges approximately from 10 nm to 30 nm.

Next, a method for fabrication of the magnetoresistive effect sensor 20 will be described.

At first, the lower magnetic shield film is formed on the substrate 10 by means of sputtering or plating, and the lower gap film 12 is formed by means of sputtering. The surface of the lower gap film 12 is ion-cleaned, and films for forming the under layer 21, anti-ferromagnetic film 22, fixed layer 23, and tunnel barrier layer 14 of the TMR film 13 are formed successively by means of sputtering. Thereafter, the laminate is subjected to natural oxidation in an oxygen atmosphere of several tens Torr without breaking the vacuum for several tens minutes to form the tunnel barrier layer 24. Furthermore, the free layer 25 is formed thereon. As described hereinabove, the TMR film 13 in accordance with the present invention is formed.

Then, a resist film having a desired configuration is formed on the TMR film, and the TMR film 13 is shaped into a predetermined shape by means of ion milling. The surface of the TMR film 13 is slightly ion-cleaned, and the magnetic flux guide 14 is formed without peeling off the resist by means of sputtering or plating to thereby remove the resist. In this process, namely by means of so-called lift-off method, the TMR film 13 and the magnetic flux guide 14 film having the desired configuration are formed. Furthermore, resist having a predetermined configuration is formed on the TMR film 13 and the magnetic flux guide 14, and the magnetic domain control film 15 is processed by means of sputtering to thereby lift-off the resist. The upper gap film 16 is formed by means of sputtering or vacuum deposition. Finally, the upper magnetic shield film 17 is formed by means of sputtering or plating, and the magnetoresistive effect sensor 20 as shown in FIG. 2A and FIG. 2B is fabricated completely.

In the present example, the TMR film 13 comprises layers of the under layer 21, the anti-ferromagnetic film 22, the first ferromagnetic film (fixed layer) 23, the tunnel barrier layer 24, and second ferromagnetic film (free layer) 25 laminated in the order from the bottom. However, the TMR film 13 may comprise layers of the ferromagnetic layer (free layer) 25, the tunnel barrier layer 24, the first ferromagnetic layer (fixed layer) 23, and anti-ferromagnetic layer 22 laminated in the reverse order from the bottom. In this case, the under layer 21 is formed to improve the magnetic characteristic of the free layer 25. Furthermore, because the magnetic flux guide should be located adjacent to the free layer 25, the magnetic flux guide 14 is formed under the TMR film 13.

A reproducing head was fabricated by use of the magnetoresistive effect sensor 20 and the reproduction characteristic was measured. As the result, the excellent and stable reproduction output is obtained, and noise such as Barkhausen noise and waveform strain such as baseline shift are not found. The vertical anisotropy of the reproduced signal lies in a range within approximately ±5%, and this value is suitable for practical use.

Second Embodiment

Figure 3A:
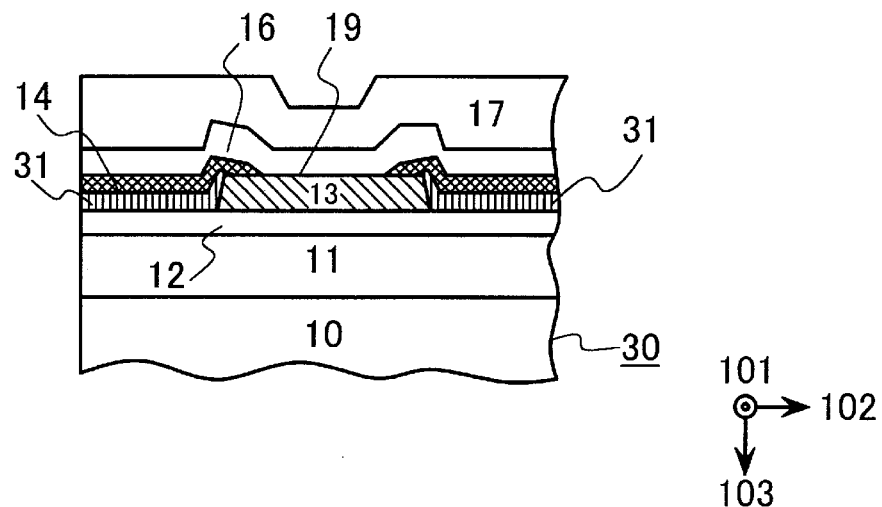
FIG. 3A is a cross sectional view of the magnetoresistive effect sensor in accordance with a second example of the present invention in the depth direction.
Figure 3B:
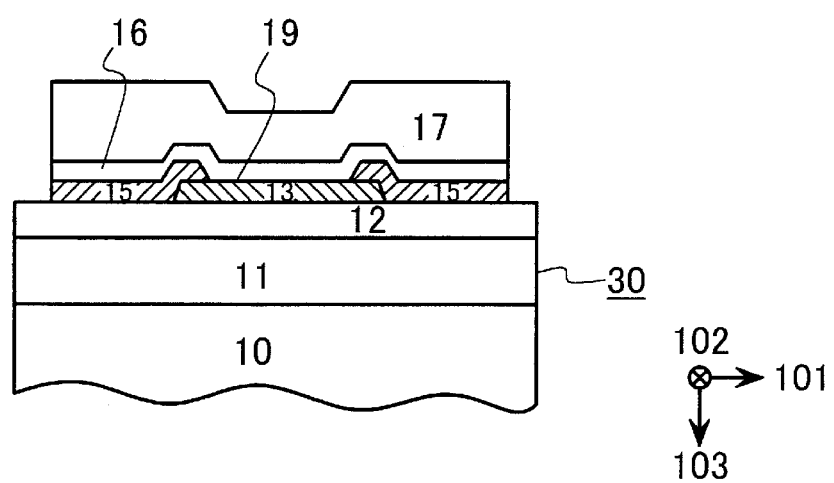
FIG. 3B is a cross sectional view of the magnetoresistive effect sensor in accordance with the second example of the present invention in the track width direction.

FIG. 3A and FIG. 3B are cross sectional views of a magnetoresistive effect sensor 30 in accordance with the second example. FIG. 3A shows the cross sectional view parallel to the head depth direction 102, and FIG. 3B shows the cross sectional view parallel to the track width direction 101. These cross sections are the same as those formed by sectioning the magnetoresistive effect sensor shown in FIG. 1. In the structure shown in FIG. 3A and FIG. 3B, the same films-and the same layers as those shown in FIG. 2A and FIG. 2B are given the same characters as shown in FIG. 2A and FIG. 2B.

The magnetoresistive effect sensor 30 shown in FIG. 3A and FIG. 3B is different from the magnetoresistive effect sensor 20 shown in FIG. 2A and FIG. 2B in that an insulating film 31 is formed both on and under the magnetic flux guide 14 or formed either on or under the magnetic flux guide 14. Therefore, only the different point is described hereinafter and the description of other components is omitted. Other structures and material selection may be the same as those described in the first embodiment.

In the case of the structure described hereinabove, a current is prevented from leaking from the upper gap film 16 to the lower gap film 12 through the magnetic flux guide 14. Therefore, the magnetic flux guide 14 consists not necessarily of high resistivity material in this example. Accordingly, metal alloys such as NiFe alloy, CoNiFe alloy, and FeSiAl alloy may be used for the magnetic flux guide 14. $Al_2O_{31}$ $SiO_2$, or mixture of $Al_2O_3$ and $SiO_2$ may be used suitably for forming the insulating film 31. The film thickness of the insulating film 31 should be equal to or thicker than 10 nm to secure the sufficient with stand voltage.

Third Embodiment

Figure 4A:
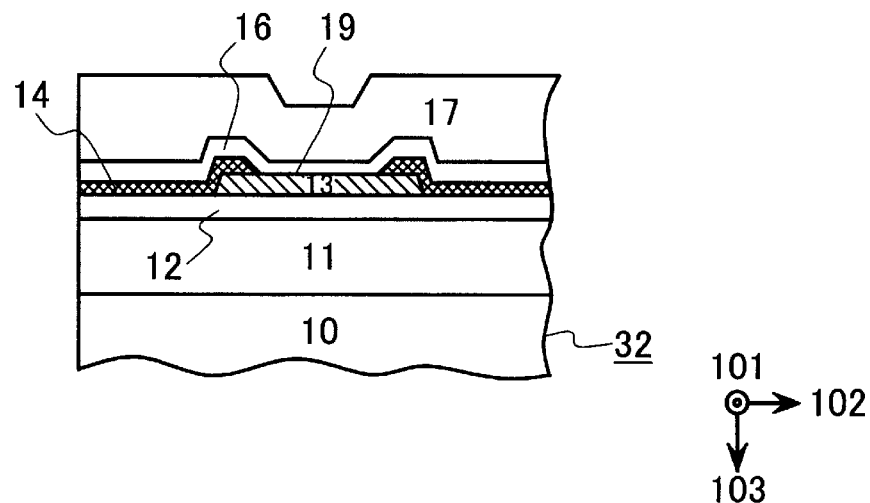
FIG. 4A is a cross sectional view of the magnetoresistive effect sensor in accordance with a third example of the present invention in the depth direction.
Figure 4B:
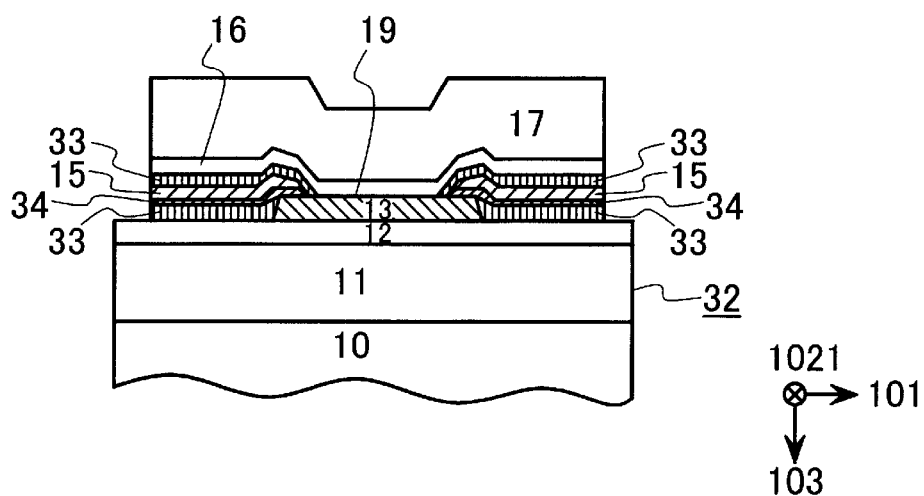
FIG. 4B is a cross sectional view of the magnetoresistive effect sensor in accordance with the third example of the present invention in the track width direction.

FIG. 4A and FIG. 4B are cross sectional views of the magnetoresistive effect sensor 30 in accordance with the second example. FIG. 4A is the cross sectional view parallel to the head depth direction 102, and FIG. 4B is the cross sectional view parallel to the track width direction 101. These cross sections are the same as those formed by sectioning the magnetoresistive effect sensor shown in FIG. 1. In the structure shown in FIG. 4A and FIG. 4B, the same films and the same layers as those shown in FIG. 2A and FIG. 2B are given the same characters as shown in FIG. 2A and FIG. 2B.

The magnetoresistive effect sensor 32 shown in FIG. 4A and FIG. 4B is different from the magnetoresistive effect sensor 20 shown in FIG. 2A and FIG. 2B in that an insulating film 33 is formed both on and under the magnetic domain control film 15 or formed either on or under the magnetic domain control film 15. Therefore, only the different point will be described hereinafter and description of other components is omitted. Other structures and material selection may be the same as those described in the first embodiment.

In the case of the structure described hereinabove, a current is prevented from leaking from the upper gap film 16 to the lower gap film 12 through the magnetic domain control film 15. Therefore, the magnetic domain control film 15 consists not necessarily of high resistivity material in the present example. Anti-ferromagnetic material such as MnIr, MnPt, FeMn, CrMn alloy or hard magnetic material such as CoCrPt alloy may be used for the magnetic domain control film 15. In this case, an under layer 34 may be formed under the magnetic domain control film 15 to strengthen the coupling magnetic field and coercive force. Film consisting of Ta, Nb, Ru, Hf, NiFe, or Cr or laminate structure comprising these films, for example, Ta/NiFe may be used as the under layer 34. $Al_2O_3$, $SiO_2$, or mixture of $Al_2O_3$ and $SiO_2$ may be used suitably as the material used for the insulating film 33. The film thickness of the under layer 34 ranges from 2 nm to 10 nm, and the film thickness of the insulating film 33 should be equal to or thicker than 10 nm to secure the sufficient withstand voltage.

Fourth Embodiment

Figure 5A:
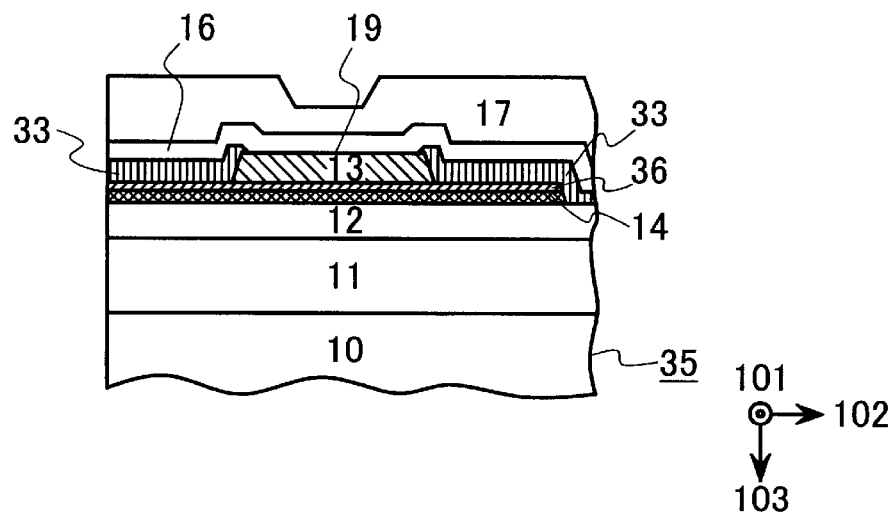
FIG. 5A is a cross sectional view of the magnetoresistive effect sensor in accordance with a fourth example of the present invention in the depth direction.
Figure 5B:
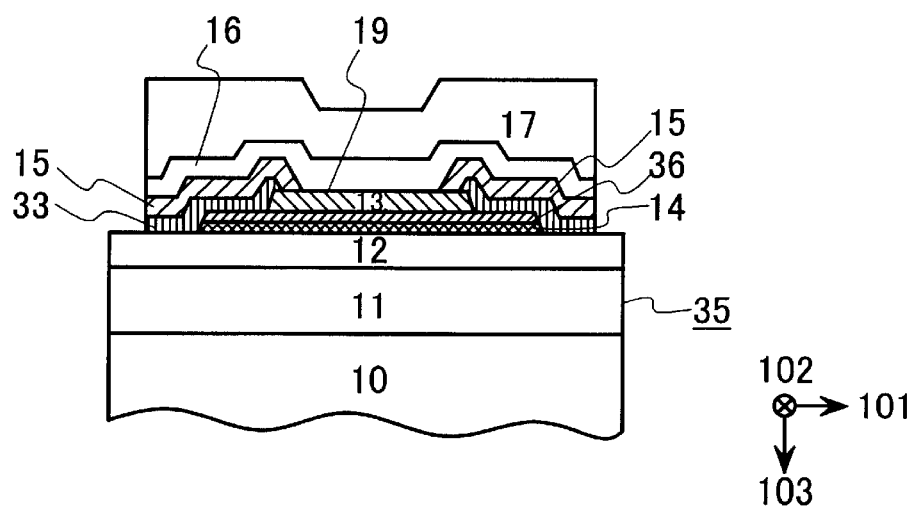
FIG. 5B is a cross sectional view of the magnetoresistive effect sensor in accordance with the fourth example of the present invention in the track width direction.

FIG. 5A and FIG. 5B are cross sectional views of the magnetoresistive effect sensor 35 in accordance with the fourth example. FIG. 5A is the cross sectional view parallel to the head depth direction, and FIG. 5B is the cross sectional view parallel to the track width direction. These cross sections are the same as those formed by sectioning the magnetoresistive effect sensor shown in FIG. 1. In the structure shown in FIG. 5A and FIG. 5B, the same films and the same layers as those shown in FIG. 2A and FIG. 2B are given the same characters as shown in FIG. 2A and FIG. 2B.

The magnetoresistive effect sensor 35 shown in FIG. 5A and FIG. 5B is different from the magnetoresistive effect sensor 20 shown in FIG. 2A and FIG. 2B in that the magnetic flux guide 14 extends continuously from the medium surface to the facing surface, and an intermediate layer 36 is formed between the free layer 26 of the TMR film 13 and the magnetic flux guide 14. In this case, the magnetic flux guide 14 is coupled ferromagnetically or anti-ferromagnetically to the free layer 26 with interposition of the intermediate layer 36. In the present example, a Ru film having a film thickness of 0.5 nm to 1 nm is used as the intermediate layer 36.

Therefore, only the different point will be described hereinafter and description of other components is omitted. Other structures and material selection may be the same as those described in the first embodiment.

Fifth Embodiment

Figure 6A:
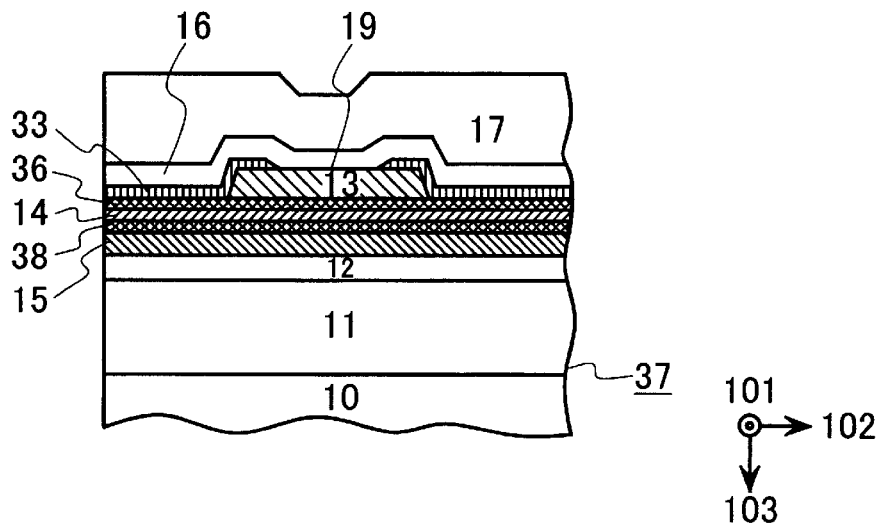
FIG. 6A is a cross sectional view of the magnetoresistive effect sensor in accordance with the a fifth example of the present invention in the depth direction.
Figure 6B:
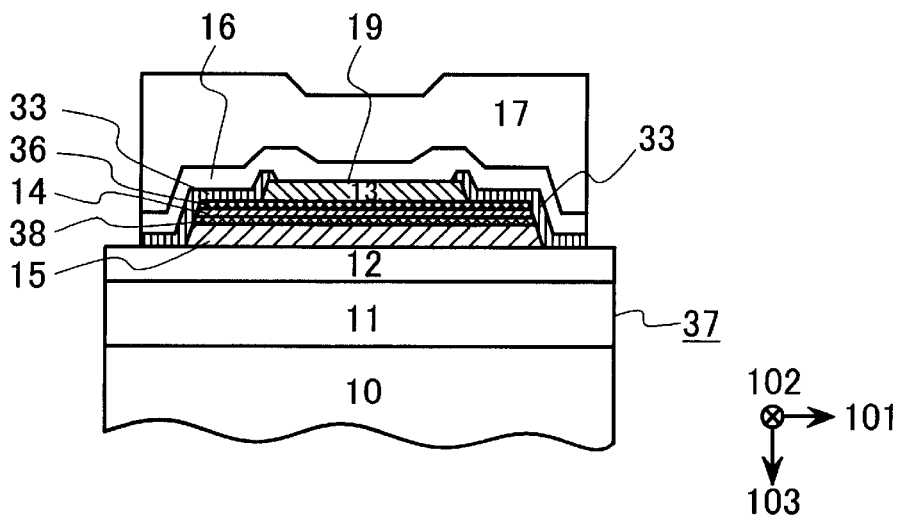
FIG. 6B is a cross sectional view of the magnetoresistive effect sensor in accordance with a fifth example of the present invention in the track width direction.

FIG. 6A and FIG. 6B are cross sectional views of the magnetoresistive effect sensor 37 in accordance with the fifth example. FIG. 6A is the cross sectional view parallel to the head depth direction, and FIG. 6B is the cross sectional view parallel to the track width direction. These cross sections are the same as those formed by sectioning the magnetoresistive effect sensor shown in FIG. 1. In the structure shown in FIG. 6A and FIG. 6B, the same films and the same layers as those shown in FIG. 2A and FIG. 2B are given the same characters as shown in FIG. 2A and FIG. 2B.

In the magnetoresistive effect sensor 37 shown in FIG. 6A and FIG. 6B, the magnetic flux guide 14 is laminated on the magnetic domain control film 15 and formed extending continuously from the medium surface of the TMR film 13 to the facing surface. Herein, the magnetic flux guide 14 may be formed directly on the magnetic domain control film 15 or may be formed with interposition of the first intermediate layer 38 that is served for adjusting the coupling.

The second intermediate layer 36 may be formed between the free layer 26 of the TMR film 13 and the magnetic flux guide 14. In this case, the magnetic flux guide 14 is coupled magnetically to the free layer 26 with interposition of the intermediate layer 36. In this structure, the magnetic domain control film 15 controls not only the magnetic domain of the magnetic flux guide 14 but also the magnetic domain of the free layer 26 simultaneously.

Sixth Embodiment

Figure 8:
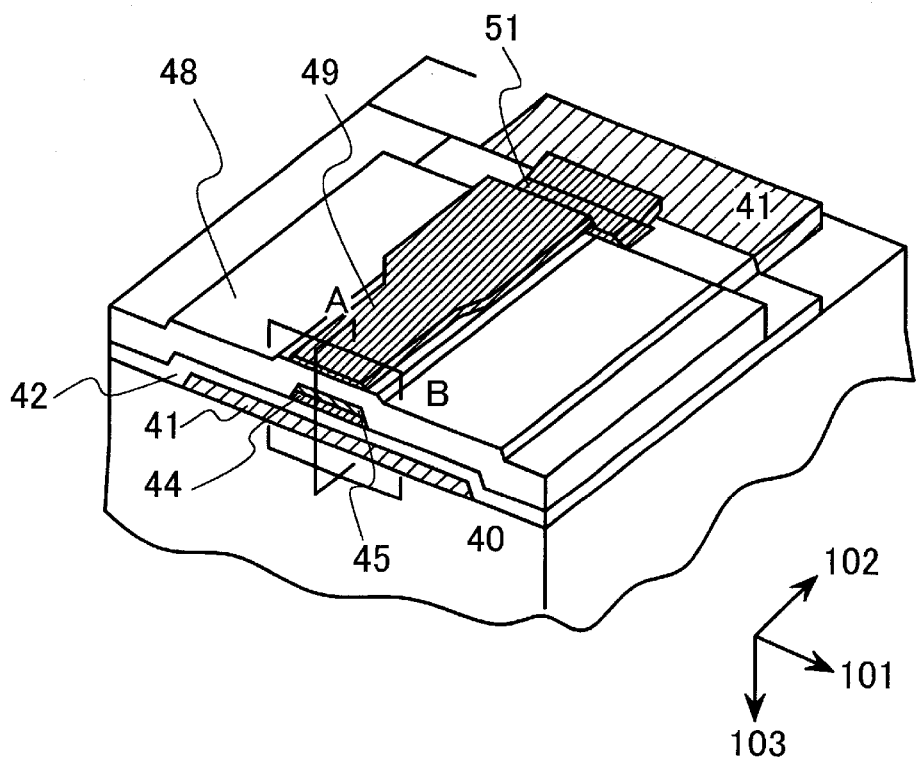
FIG. 8 is a perspective view of a sixth example of a magnetoresistive effect sensor in accordance with the present invention.

FIG. 8 is a perspective view of a magnetoresistive effect sensor in accordance with a sixth embodiment.

An under layer 41, a protection film 42, a protective layer 42, a TMR film 43, the first magnetic flux guide 44, a magnetic domain control film 45, an insulating gap film 48, and the second magnetic flux guide 49 are formed on a substrate 40. The under layer 41 and the second magnetic flux guide 49 have respective lead electrode terminals 50. The lead electrode terminal 50 is served also as an electrode for supplying a current in the film thickness direction of the TMR film 43.

The azimuth of the magnetoresistive effect sensor is defined by the track width direction 101, the head depth direction 102, and the magnetic head driving direction 103, then A and B in FIG. 8 show the cross section parallel to the head depth direction 102 and the cross section parallel to the track width direction respectively.

Figure 9A:
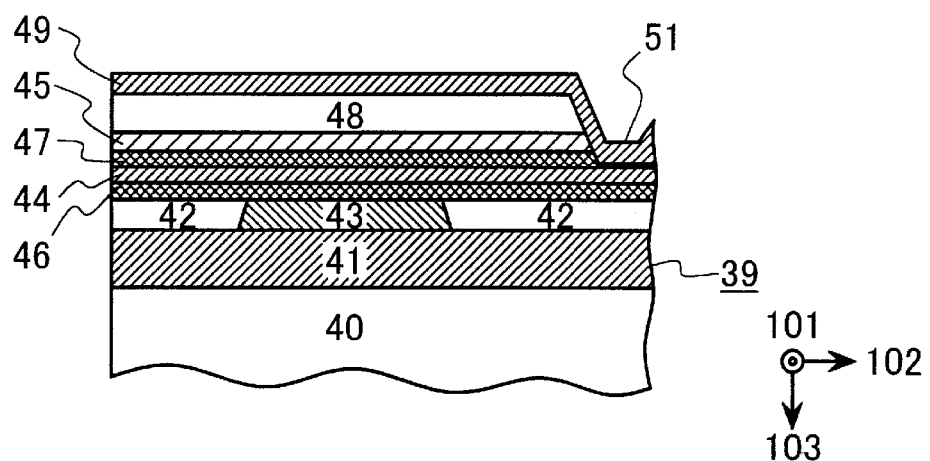
FIG. 9A is a cross sectional view of the magnetoresistive effect sensor in accordance with the sixth example of the present invention in the depth direction.
Figure 9B:
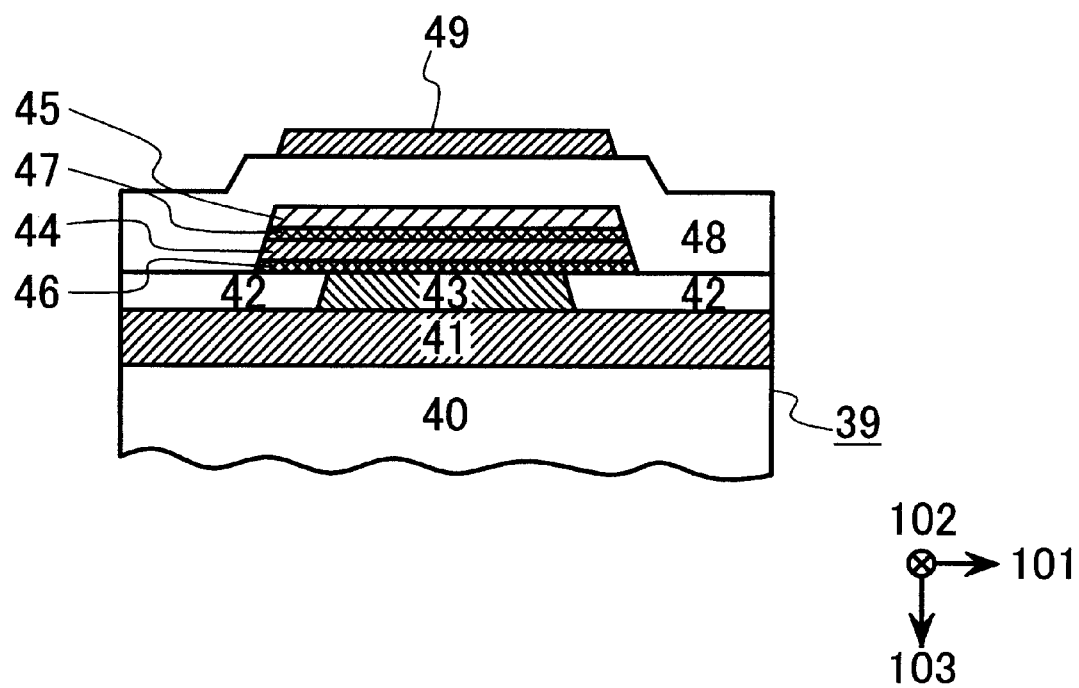
FIG. 9B is a cross sectional view of the magnetoresistive effect sensor in accordance with the sixth example of the present invention in the track width direction.

FIG. 9A shows the cross sectional view of the magnetoresistive effect sensor 39 parallel to the head depth direction 102 and the FIG. 9B shows the cross sectional view parallel to the track width direction 101.

In the present example, the under layer 41 having a predetermined configuration is formed on the substrate 40. On the under layer 41, the TMR film 43 is disposed at the position apart from the air bearing surface. In the present example, the protective film 42 is formed so as not to override on the edge of the TMR film 43. The TMR film 43 has the same structure as that of the RMR film 13 shown in FIG. 2.

Furthermore, the first intermediate layer 46, the first magnetic flux guide 44, the second intermediate layer 47, and the magnetic domain control film 45 are formed in the order from the bottom, and disposed extending continuously from the air bearing surface side in the head depth direction 102 on the TMR film 43. The first magnetic flux guide 44 is a soft magnetic film served for guiding the magnetic flux from the medium to the TMR film 43, and which is coupled magnetically to the TMR film 43 with interposition of the first intermediate layer 46. The magnetic domain control film 45 is a ferromagnetic film served for applying a bias magnetic field in order to suppress the generation of the magnetic domain of the magnetic flux guide 14 and the free-layer 25 of the TMR film, and the size is changed depending on the second intermediate layer 47. The insulating gap film 48 is disposed so as to surround the TMR film 43, the magnetic flux guide 44, and the magnetic domain control film 45 on these films. Furthermore, the second magnetic flux guide 49 is disposed on the insulating gap film 48. The first magnetic flux guide 44 is in contact with the second magnetic flux guide 49 on the side 51 opposite to the air bearing surface. The second magnetic flux guide 49 and the under layer film 41 have respective lead electrode terminals 50, a current is supplied and the reproduction output is detected through the connection of these electrode terminals. When a current is supplied to these electrode terminals 50, the current flows from the second magnetic flux guide 49 to the first magnetic flux guide 44 and the TMR film 43 in the film thickness direction through the connections 51.

Next, various materials will be described

The under layer 41 desirably has the smooth and clean surface so that the characteristic of the TMR film 43 is stable and exhibits high resistance change, and consists of the same material as that used for the lower gaps film 12 described in the first embodiment (FIG. 2). The film thickness of the under layer ranges from 3 to 30 nm.

The first and second magnetic flux guides 44 and 49 comprise a film consisting of soft magnetic material having low resistivity such as NiFe alloy, CoNiFe alloy, or FeSiAl alloy because these guides 44 and 49 are also served as the electrode. The film thickness ranges from 5 to 20 nm. The protective film 42 and the insulating gap film 48 consist of $Al_2O_3$, $SiO_2$, or $Al_2O_3$ $SiO_2$. The film thickness is equal to or thicker than 20 nm to secure the sufficient withstand voltage. Other films, namely the first and second intermediate layers 46 and 47, magnetic domain control film 45, and TMR film 43, consist of the respective same materials as those described in the embodiments 1 to 5.

The case in which the under layer 41, TMR film 43, first magnetic flux guide 44, insulating gap film 46, and second magnetic flux guide are laminated in the order from the bottom side is described in the present example, but the case in which the lamination order is reverse may be employed. Furthermore, the case in which the electrode terminal 50 is disposed on the second magnetic guide 49 is described in the present example, but the case in which the electrode terminal 50 is disposed on the first magnetic flux guide 44 may be employed. Furthermore, the magnetic domain of both first and second magnetic flux guides may be controlled in the case of the magnetoresistive effect sensor having two magnetic flux guides, namely the first and second magnetic flux guides, as in the embodiment.

The case in which the magnetic domain control film 45 and the magnetic flux guide 44 are laminated in the structure is described in the present example, but the case to which the structure shown in the first to fourth embodiments is applied may be employed.

A reproducing head was fabricated by use of the magnetoresistive effect sensor 39, and the reproduction characteristic was measured. As the result, the excellent and stable reproduction output is obtained, and noise such as Barkhausen noise and waveform strain such as baseline shift are not found. The vertical anisotropy of the reproduced signal lies in a range within approximately ±5%, and this value is suitable for practical use.

Seventh Embodiment

FIG. 7 shows a schematic diagram illustrating a magnetic disk apparatus provided with the magnetoresistive effect sensor 20 to which the present invention is applied. Recording medium consisting of CoCrPt base alloy film is deposited by means of, for example, spattering on the surface of the magnetic disk 53 formed of metal or glass disk that is rotated by means of the spindle motor 54. This apparatus is served for recording/reproducing the digital signal on the recording medium by use of the thin film magnetic head formed on the ceramic chip (slider) 55 that floats with aid of air flow concomitantly with rotation of the disk. For example, the thin film magnetic head comprises an induction type recording head having NiFe base alloy magnetic pole and a Cu coil and a yoke type magnetic head described in the first embodiment.

Furthermore, the ceramic chip is attached on a movable arm, and the arm is movable substantially in the radial direction by means of the actuator 56 having a voice coil motor. Therefore, the thin film magnetic head can take access to every where on the entire disk. Furthermore, the servo signal served for indicating the track position is recorded on the recording medium other than the recording signal, and the reproducing head feeds back the servo signal reproduced by means of the reproducing head to the actuator to thereby position the head at high accuracy by means of the closed loop control. Furthermore, the magnetic disk apparatus is provided with a data signal recording/reproducing system 57 and electric circuit system 58 that are served for processing of the reproduction signal and servo signal and for controlling the mechanical system. This apparatus can achieve high recording density by using a thin film magnetic head disclosed hereinbefore. As the result, a small-sized apparatus having a large capacity is realized.

The apparatus having one disk is disclosed hereinabove, but it is apparent that the same effect is obtained when the apparatus having a plurality of disks is used.

The present invention provides a magnetoresistive effect sensor that is a yoke type magnetoresistive effect sensor having a tunnel magnetoresistive effect film, which is operated stably with suppressed Barkhausen noise.

What is claimed is:

1. A magnetic head comprising:

a magnetoresistive effect sensor provided with a magnetoresistive effect film having a free layer including a ferromagnetic layer of which magnetization is rotatable corresponding to the external magnetic field, a pair of electrodes for supplying a current in the film thickness direction of the magnetoresistive effect film, a magnetic flux guide for guiding a magnetic flux from a recording medium surface to the magnetoresistive effect film, and an insulating layer formed at least on and under the magnetic flux guide, a magnetic domain control layer for applying a bias magnetic field on the free layer of the magnetoresistive effect film and the magnetic flux guide, wherein said magnetic flux guide is disposed continuously from the medium surface side to the opposed medium surface side.

2. A magnetic head according to claim 1, wherein said magnetic domain control layer comprises a high resistivity material.

3. A magnetic head comprising:

a magnetoresistive effect sensor provided with a magnetoresistive effect film having a free layer including a ferromagnetic layer of which magnetization is rotatable corresponding to the external magnetic field, a pair of electrodes for supplying a current in the film thickness direction of the magnetoresistive effect film, a magnetic flux guide for guiding a magnetic flux from a recording medium surface to the magnetoresistive effect film, and an insulating layer formed at least on and under the magnetic flux guide, a magnetic domain control layer for applying a bias magnetic field on the free layer of the magnetoresistive effect film and the magnetic flux guide, wherein said magnetic flux guide is disposed separately from the medium surface side to the opposed medium surface side.

4. A magnetic head according to claim 3, wherein said magnetic domain control layer comprises a high resistivity material.

5. A magnetic recording/reproducing apparatus comprising:
   a magnetic medium; and,
   a magnetic head including:
   a magnetoresistive effect sensor provided with a magnetoresistive effect film having a free layer including a ferromagnetic layer of which magnetization is rotatable corresponding to the external magnetic field,
   a pair of electrodes for supplying a current in the film thickness direction of the magnetoresistive effect film,
   a magnetic flux guide for guiding a magnetic flux from a recording medium surface to the magnetoresistive effect film, and
   an insulating layer formed at least on and under the magnetic flux guide,
   a magnetic domain control layer for applying a bias magnetic field on the free layer of the magnetoresistive effect film and the magnetic flux guide,
   wherein said magnetic flux guide is disposed continuously from the medium surface side to the opposed medium surface side.

6. An apparatus according to claim 5, wherein said magnetic domain control layer comprises a high resistivity material.

7. An apparatus according to claim 5, wherein said apparatus is a magnetic disk recording/reproducing apparatus.

8. A magnetic recording/reproducing apparatus comprising:
   a magnetic medium; and,
   a magnetic head including:
   a magnetoresistive effect sensor provided with a magnetoresistive effect film having a free layer including a ferromagnetic layer of which magnetization is rotatable corresponding to the external magnetic field,
   a pair of electrodes for supplying a current in the film thickness direction of the magnetoresistive effect film,
   a magnetic flux guide for guiding a magnetic flux from a recording medium surface to the magnetoresistive effect film, and
   an insulating layer formed at least on and under the magnetic flux guide,
   a magnetic domain control layer for applying a bias magnetic field on the free layer of the magnetoresistive effect film and the magnetic flux guide,
   wherein said magnetic flux guide is disposed separately from the medium surface side to the opposed medium surface side.

9. An apparatus according to claim 8, wherein said magnetic domain control layer comprises a high resistivity material.

10. An apparatus according to claim 8, wherein said apparatus is a magnetic disk recording/reproducing apparatus.

11. An electronic system comprising:
    a magnetic medium; and,
    a magnetic recording/reproducing apparatus having a magnetic head including:
    a magnetoresistive effect sensor provided with a magnetoresistive effect film having a free layer including a ferromagnetic layer of which magnetization is rotatable corresponding to the external magnetic field,
    a pair of electrodes for supplying a current in the film thickness direction of the magnetoresistive effect film,
    a magnetic flux guide for guiding a magnetic flux from a recording medium surface to the magnetoresistive effect film, and
    an insulating layer formed at least on and under the magnetic flux guide,
    a magnetic domain control layer for applying a bias magnetic field on the free layer of the magnetoresistive effect film and the magnetic flux guide,
    wherein said magnetic flux guide is disposed continuously from the medium surface side to the opposed medium surface side.

12. A system according to claim 11, wherein said magnetic domain control layer comprises a high resistivity material.

13. A system according to claim 11, wherein said apparatus is a magnetic disk recording/reproducing apparatus.

14. A system according to claim 11, wherein said system is at least one of a computer and an information processing equipment.

15. An electronic system comprising:
    a magnetic medium; and,
    a magnetic recording/reproducing apparatus having a magnetic head including:
    a magnetoresistive effect sensor provided with a magnetoresistive effect film having a free layer including a ferromagnetic layer of which magnetization is rotatable corresponding to the external magnetic field,
    a pair of electrodes for supplying a current in the film thickness direction of the magnetoresistive effect film,
    a magnetic flux guide for guiding a magnetic flux from a recording medium surface to the magnetoresistive effect film, and
    an insulating layer formed at least on and under the magnetic flux guide,
    a magnetic domain control layer for applying a bias magnetic field on the free layer of the magnetoresistive effect film and the magnetic flux guide,
    wherein said magnetic flux guide is disposed separately from the medium surface side to the opposed medium surface side.

16. A system according to claim 15, wherein said magnetic domain control layer comprises a high resistivity material.

17. A system according to claim 15, wherein said apparatus is a magnetic disk recording/reproducing apparatus.

18. A system according to claim 15, wherein said system is at least one of a computer and an information processing equipment.

* * * * *